United States Patent
Ballate et al.

(10) Patent No.: US 7,774,101 B2
(45) Date of Patent: Aug. 10, 2010

(54) SYSTEM AND METHOD FOR MANAGING BUILDINGS

(76) Inventors: Orlando E. Ballate, 145 Main St., 2nd Floor, Hackensack, NJ (US) 07601; Venkitasamy Perumalsamy, 145 Main St., 2nd Floor, Hackensack, NJ (US) 07601

(*) Notice: Subject to any disclaimer, the term of this patent is extended or adjusted under 35 U.S.C. 154(b) by 200 days.

(21) Appl. No.: 11/848,117

(22) Filed: Aug. 30, 2007

(65) Prior Publication Data

US 2008/0058970 A1 Mar. 6, 2008

Related U.S. Application Data

(60) Provisional application No. 60/824,061, filed on Aug. 30, 2006.

(51) Int. Cl.
*G06F 19/00* (2006.01)
(52) U.S. Cl. ............... 700/275; 700/277; 340/573.4; 707/999.1; 707/999.107
(58) Field of Classification Search ......... 700/275–277; 340/573.4; 705/1; 707/100, 104.1, 999.1, 707/999.107

See application file for complete search history.

(56) References Cited

U.S. PATENT DOCUMENTS

| | | | |
|---|---|---|---|
| 7,076,452 B2 * | 7/2006 | Florance et al. ............... | 705/26 |
| 2005/0197847 A1 * | 9/2005 | Smith ............................. | 705/1 |
| 2006/0211404 A1 * | 9/2006 | Cromp et al. ............... | 455/405 |
| 2006/0224629 A1 * | 10/2006 | Alexander et al. ........ | 707/104.1 |

* cited by examiner

*Primary Examiner*—Albert DeCady
*Assistant Examiner*—Douglas S Lee
(74) *Attorney, Agent, or Firm*—Ronald J. Koch

(57) ABSTRACT

A method for managing buildings comprises providing a computer database 10 operative to store information relating to at least one building 30, said information comprising building characteristics; Each said building having associated therewith a facility; Each said facility having associated therewith an account; Providing an operational link between a user and said computer database 20, receiving a user request to interact with said computer database 100, providing means for a user to establish a selected account 101, 102, providing means for a user to establish a selected facility 103, providing means for a user to establish a selected building 104, and presenting a user with information relating to said selected building 105.

20 Claims, 10 Drawing Sheets

SYSTEM AND METHOD FOR MANAGING BUILDINGS

CLAIM OF PRIORITY BASED ON APPLICATION

The present application is related to the provisional patent application No. 60/824,061 of Venkitasamy Perumalsamy et al, filed Aug. 30, 2006, entitled "System And Method For Building Engineering Management And Programming", and based on which priority is herewith claimed under 35 U.S.C. 119(e) and the disclosure of which is incorporated herein by reference in its entirety as if fully rewritten herein.

BACKGROUND AND SUMMARY

The present invention relates generally to management of man made structures such as building and facilities and specifically to automated means of said management.

Building and facilities management personnel and owners need an easy way to manage all aspects of their properties. Conventional systems allow management of certain aspects (e.g. climate control) of a facility but do not presently allow management of all aspects of a facility either individually or in the aggregate.

Accordingly, it is desirable to provide a system and method to allow monitoring and control of every aspect of a facility by providing an easy to use computer interface.

The present invention facilitates, by an easy to use "point and click" computer interface, space management, project delivery management, operations management and capital asset management thus simplifying, utilization, programming, design, construction, operations, planned maintenance, user requested needs, repairs, retrofits upgrades, improvements, replacements, and space planning.

The invention also simplifies due diligence studies, condition assessment of properties, testing and repair programming, preparation of cost estimates, project program management, construction documents, construction management, construction, management & training, information technology (it) management, storage, and hardware & training.

In operation, all or part of any aspects or characteristics of a facility (i.e. any man made structure) or group of facilities are measured, collected, and/or input into a computer database or computer memory. Thus, all characteristics may be grouped or filtered and viewed by intuitive graphical and/or textual interfaces. These characteristics can be manipulated in real time or simply observed to gain understanding.

For example, a user who owns or manages several office buildings may view energy usage in real time. The usage may be expressed in units of energy or the cost of the energy. Having a thorough knowledge of the energy usage of individual as well as aggregate properties can allow users to make informed purchases of energy. Deregulation of utilities allows bulk purchases of energy. Understanding the energy usage of properties can help decisions to purchase off peak energy.

Another example illustrates viewing a building by temperature zone (the area controlled by a given thermostat). The user can identify areas where energy is being unnecessarily used.

Another example illustrates a user viewing all electrical motors by size (horsepower), age, location, or energy usage (kWhrs). The user can preclude problems by early diagnosis of need of replacement or preventive maintenance. The invention can provide a database of motor dealers or repair facilities matched to the motors. The user can place orders online for new equipment or order repair services.

The invention allows users to view actual Arial or street view photographs of buildings. In contrast, buildings can be viewed as virtual images using colors to distinguish given characteristics such as areas (e.g. shipping and receiving, lobby, offices, etc.)

The invention provides a way to view complete, and up date, building schematics (drawings). The drawings can be viewed by electrical, mechanical, architectural, plumbing, etc. Doing so is advantageous and can assist in the addition or repair of equipment, law enforcement, or firemen, to name a few.

The invention can provide a complete inventory of all equipment. The equipment may be categorized. For example, energy using equipment vs. furniture. The equipment can be subcategorized and further sorted and grouped by energy used, type of energy, capital cost, and operational cost.

The invention is advantageous in that equipment can be viewed in multiple buildings. The age of the equipment, as well as other historical data, can be viewed. Thus, users may take advantage of bulk discounts by identifying equipment needing replacement and order larger quantities.

Other benefits include cost savings, asset lifecycle modeling, accountability, transparency, accessible via internet or wireless networks, custom tailored to meet client needs, can easily switch between properties saving time and costs, integrates all the building management functions such as leasing, work orders, operations, repair and maintenance into one click easy to use tool, the program is tailored to meet customers buildings, requirements and needs, the facility management tool is engineered for each customer to manage their daily information needs in a "click easy" format using interactive 3d virtual graphics with 24/7 access either on site or remotely via internet or other types of networks (cellular, wwan, wlan, etc.).

One example of a preferred embodiment (this example is for illustrative purposes and as such is only one of many uses) of the present invention comprises a property management company having a user that logs in to a website using name, password and/or other parameters.

Upon login, the user is presented with an account list. An "Asset list" and "Asset map" are provided for each account.

The Asset map comprises a graphical geographic map with indicators or flags showing each location for each company. Geographic regions (e.g. Midwest) are color coded. The user may click on a region.

The Asset list comprises textual listings of "regions", "facilities", and "buildings" for a given account.

Each account represents a different company. Each company has multiple locations. Each location can have multiple buildings that can be manufacturing or process facilities.

The user clicks (the definition of "clicks" or "click" as used herein is defined as, in addition to dictionary and normal usage, as using the mouse or similar input device on a computer relative to a graphical user interface to create a software event) on one account thereby causing the asset map and asset list to show locations and buildings for that account.

The map displays textual information about each flag on mouse-over. The term "mouse-over" is defined as, in addition to dictionary and ordinary meanings, as the graphical image of the mouse cursor moving over a region of the graphical user interface. The user may click on either one of the flags of the map or the textual listings of buildings or locations.

By using the above method, the user eventually selects a specific site which may have several buildings. The user may then view site specific information in textual or graphic form. The graphical form comprises actual photos or graphical renderings. The user may graphically manipulate the image by using the mouse to rotate, zoom, or pan the image. Thus, different sides or sections of a building may be viewed.

The user may click on any exterior facade of the building to display specific information. The user may zoom in and through walls to display inner rooms and equipment. The user may click on any piece of equipment, wall, or other structure to display information.

Information that is displayed comprises physical characteristics, maintenance, proposals, reports, drawings (schematics, or other), projects (e.g. motor replacement), funding sources or any other information deemed important. The user may modify the data displayed or add new data or delete existing data.

DETAILED DESCRIPTION

There are presented herein various alternate embodiments for carrying out the present invention. Although these embodiments differ in some aspects, there are various methods and systems common to all embodiments. These similar systems and methods are not always repeated for each embodiment. Rather, it is to be understood and it will be apparent that same are being employed. For example, a user at a computer terminal logging on to a system to gain access to a database is common to all embodiments.

There is provided herein various means for a user to establish a selection. This is generally accomplished by the user being presented with various graphical and/or textual visualizations. For example, a drop down list or graphical representation such as a building icon or photograph is used. The user chooses from a set of choices thus establishing a selection.

There are known means for remotely controlling the physical characteristics of a building. For example, programmable logic controllers (such as those made by Allen-Bradley and Rockwell Automation) interact with relays that control valves and switches that control electricity. The physical characteristics comprise climate control systems, lighting, electrical systems, and plumbing systems.

FIGS. 1, 2, 4 & 5, depict a preferred embodiment of a method for managing buildings. A computer database 10 operates to store information relating to at least one building 30, the information comprising building characteristics. As used herein, the term "building" may be described as an asset. Each building has associated therewith a facility, and each facility has associated therewith an account.

Figure 5:
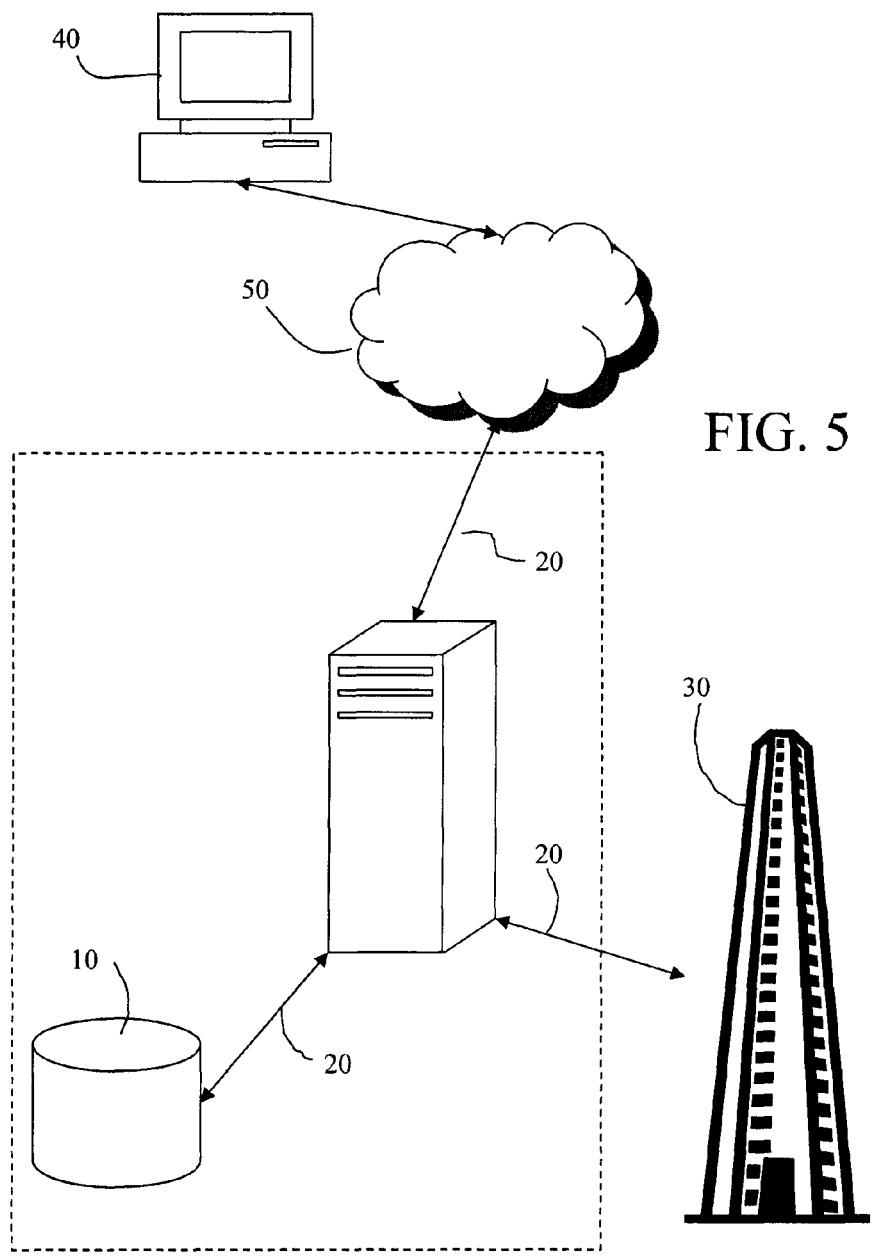
FIG. 5 depicts a block diagram
Figure 6:
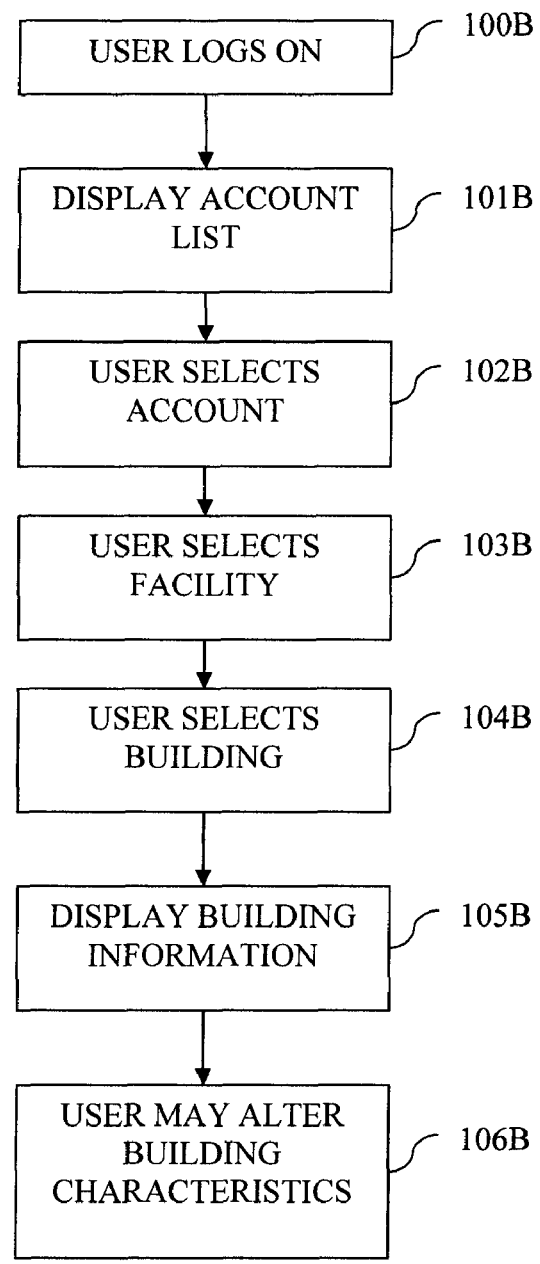
FIG. 6 depicts a flow diagram of an alternative embodiment
Figure 7:
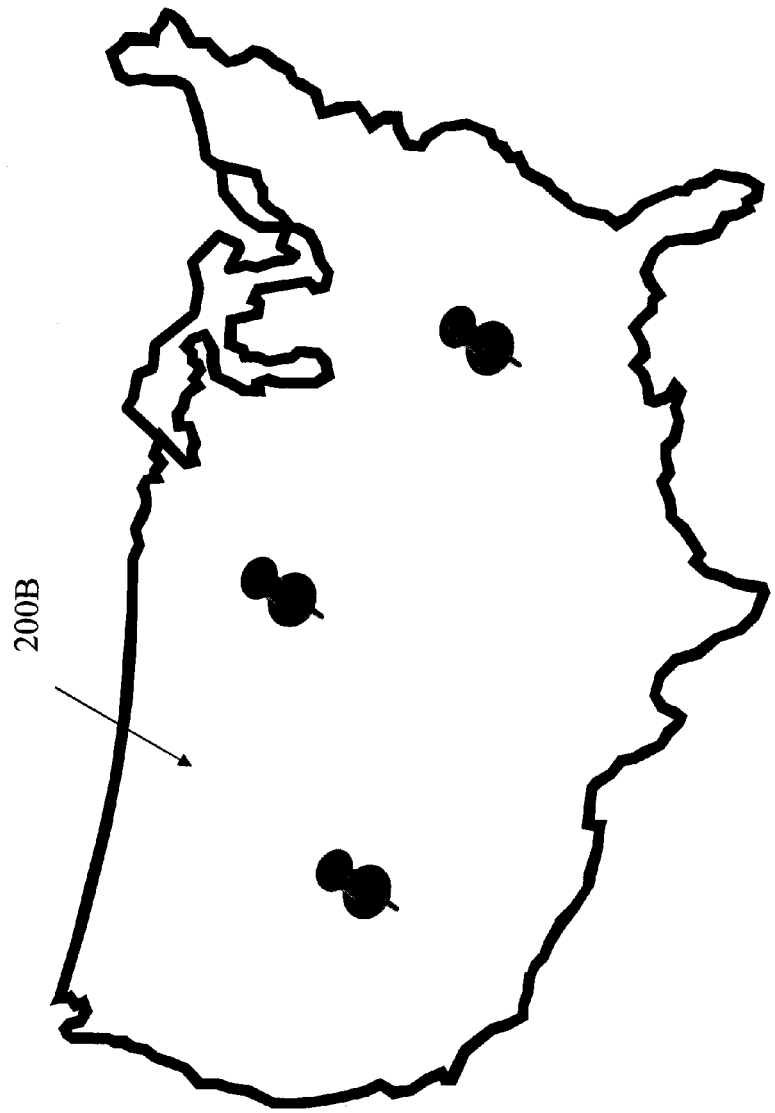
FIG. 7 depicts a graphical representation of a map of an alternative embodiment

There is provided an operational link 20 between a user and the computer database 10. It is to be understood that the phrase "operational link" as used herein includes widely known systems and methods for networking computers and databases. As depicted in FIG. 5 (an analogous relationship exists with other embodiments described herein), a user at a computer terminal 40 gains access to the present invention through a computer network methodology 50 such as the internet.

A user request to interact with the computer database is received 100. This is accomplished using known methods for facilitating a user logging on to a computer system that incorporates a database.

There is provided means for a user to establish a selected account 101, 102. There is provided means for a user to establish a selected facility 103. There is provided means for a user to establish a selected building 104. There is provided means for presenting a user with information relating to the selected building 105.

The means for a user to establish a selected account comprises the step of presenting the user with a map 200 depicting geographic information relating to the buildings, the map operates to receive user input. Although preferred, other embodiments, such as a drop down list, are possible.

Figure 1:
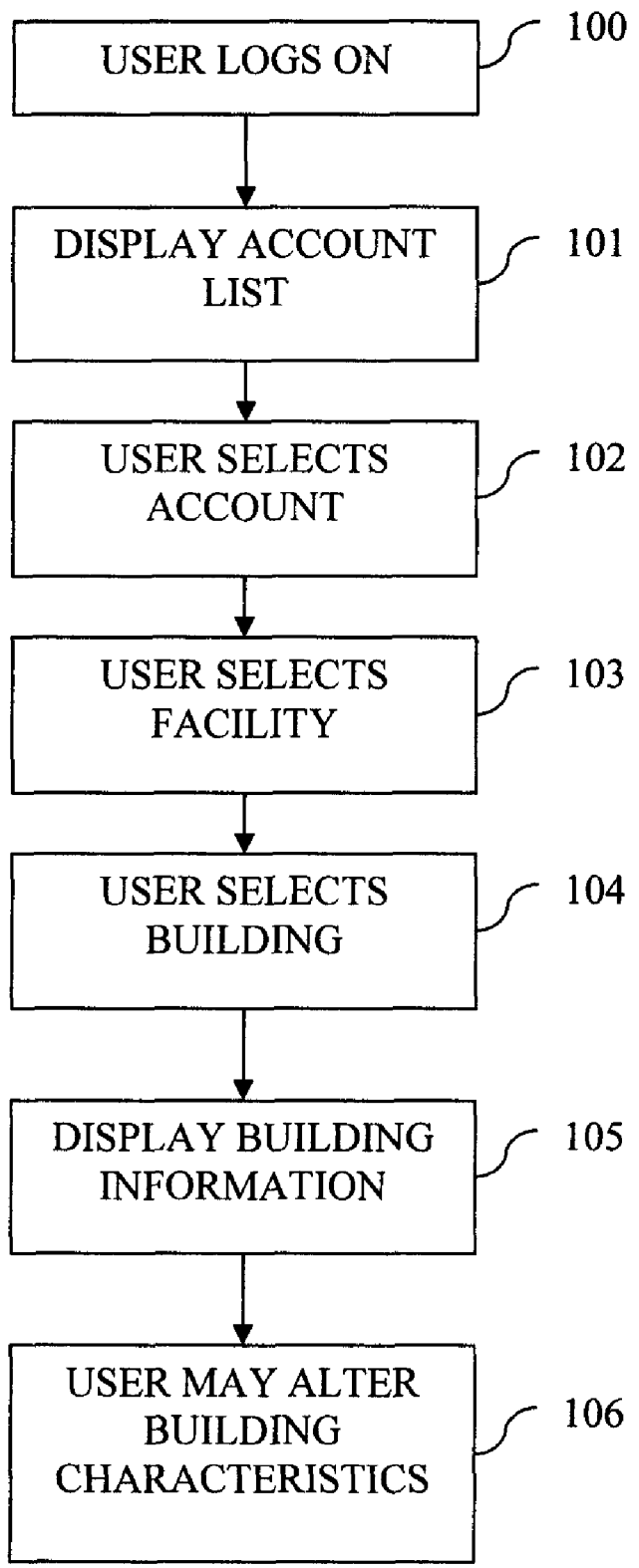
FIG. 1 depicts a flow diagram
Figure 2:
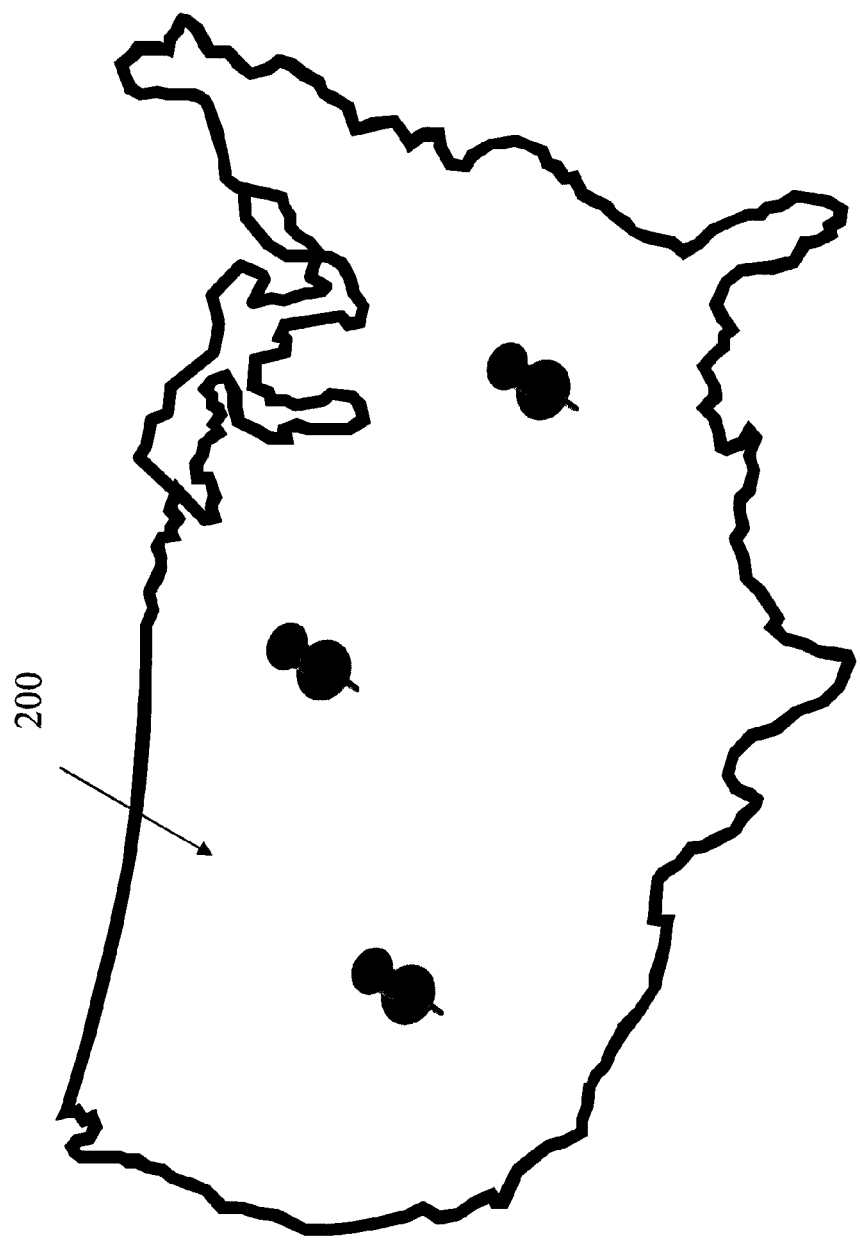
FIG. 2 depicts a graphical representation of a map
Figure 3:
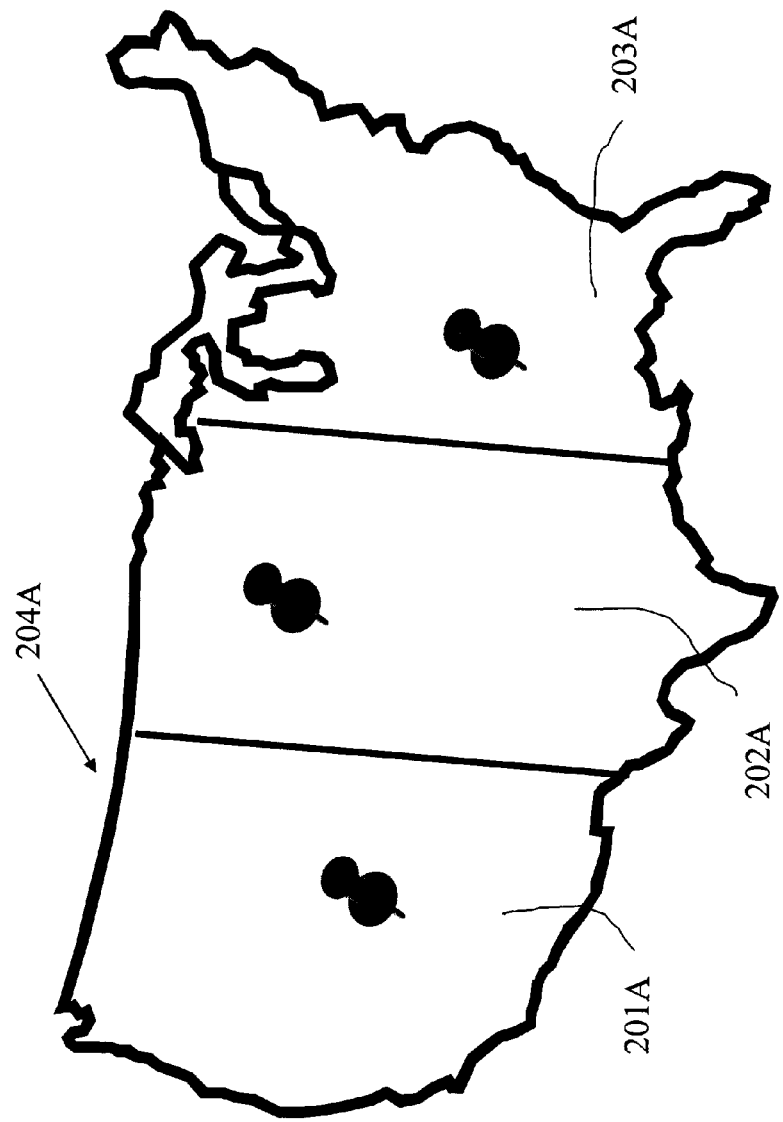
FIG. 3 depicts a graphical representation of a map of an alternative embodiment
Figure 4:
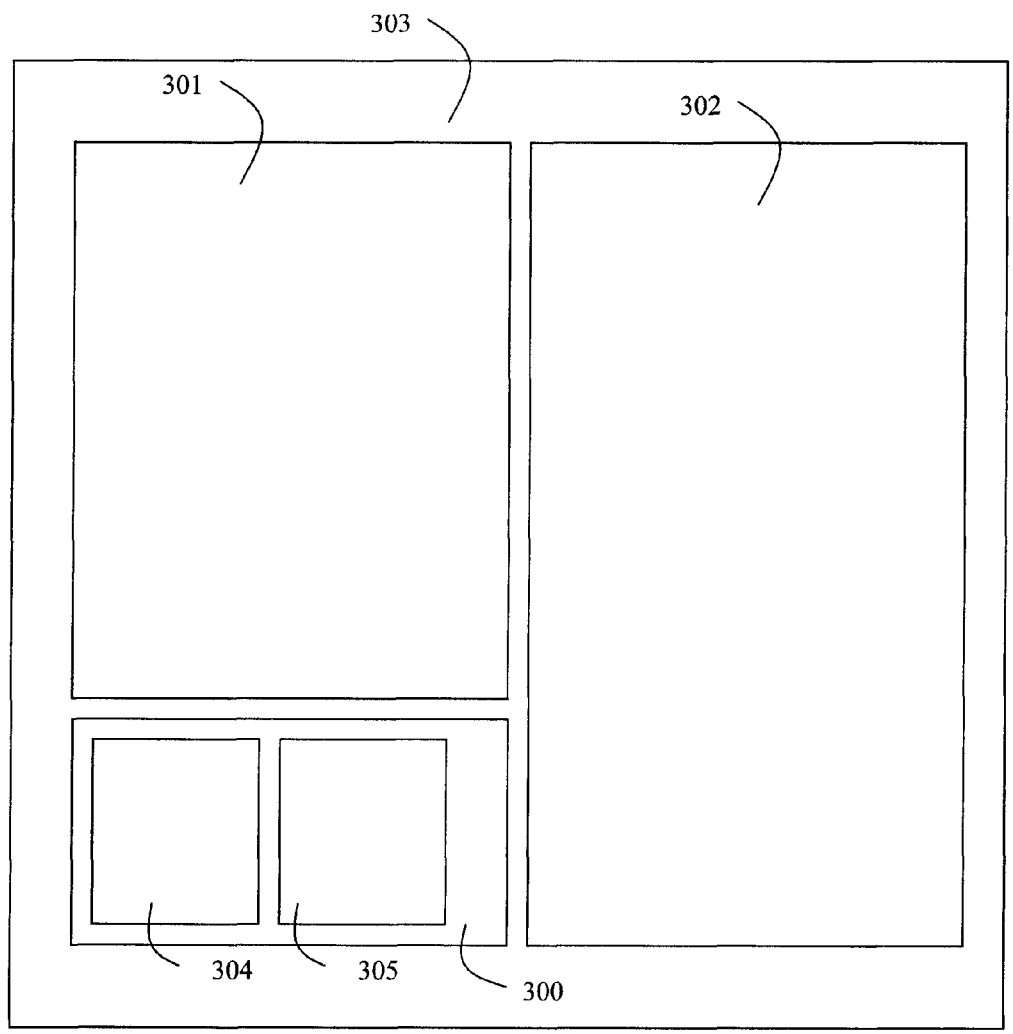
FIG. 4 depicts a graphical representation of a display

FIG. 3 depicts an alternative embodiment comprising map 204A having color coded regions, 201A, 202A, 203A. The choice of 3 regions is arbitrary and thus other numbers may be used.

The user is presented with information operative to create a graphical display 303. A first region 300 operates to display adjacent photographs 304, 305 of at least two buildings associated with the selected facility. The user can scroll this list sequentially to view all associated buildings.

A second region 301 operates to display a three dimensional image representative of the selected building and operates to allow manipulation of the view perspective of the three dimensional image. For example, an aerial photograph of a building may be rotated so as to view different sides of the building or to view rooftop equipment such as hvac equipment.

Figure 9:
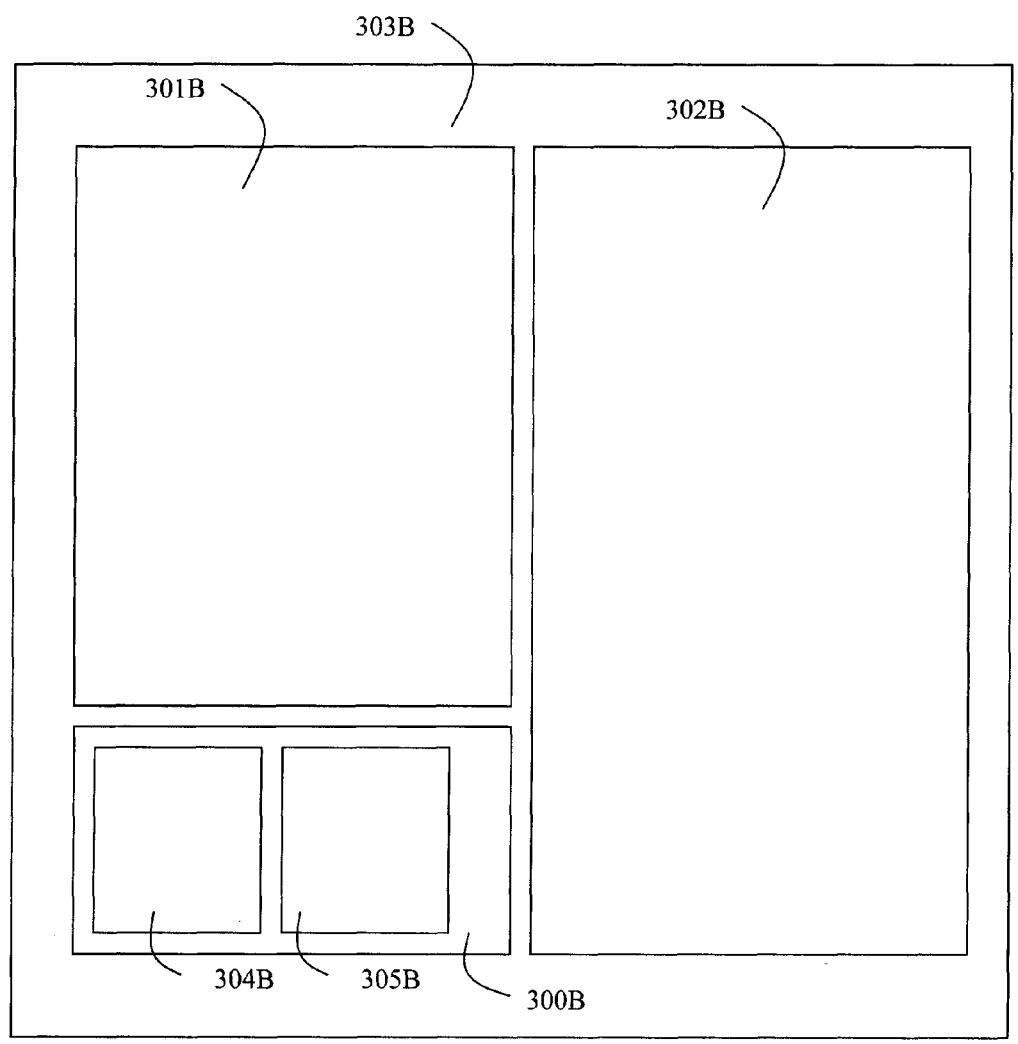
FIG. 9 depicts a graphical representation of a display of an alternative embodiment
Figure 10:
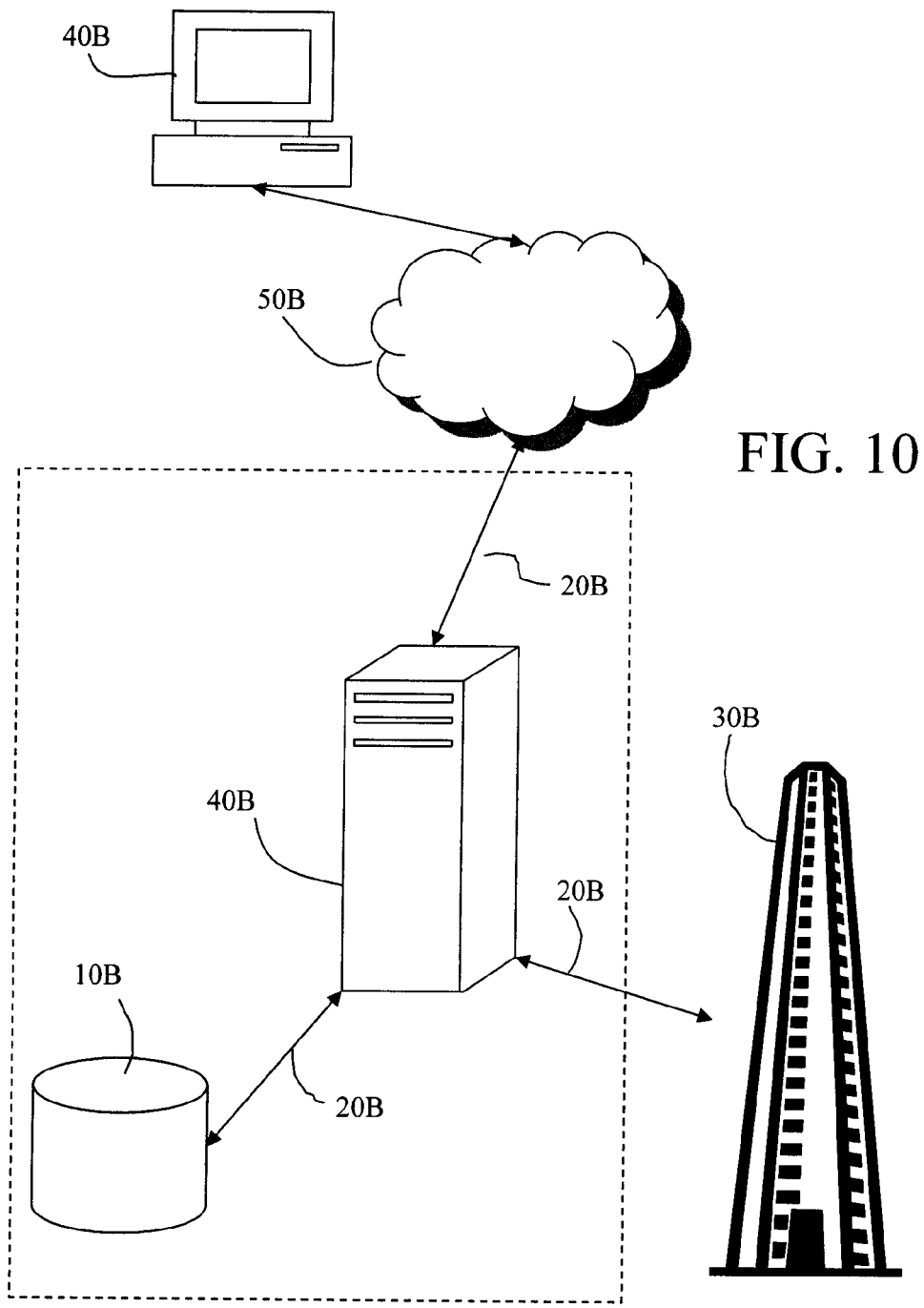
FIG. 10 depicts a block diagram of an alternative embodiment

A third region 302 operates to display information relating to the selected building. It is possible to display myriad information about a building. For example, aerial photograph, building name, facility name, region name, primary human contact, address, number of floors, gross area, ownership, year built, structure type, total roof area, total facade area, number of roof sections, number of facade sections, current projects, capital improvements, proposals, reports, drawings, schematics, funding. An analogous relationship exists for third region 302B (FIG. 9). The second region 301 is larger than the first region 300.

There is provided an operational link 20 between a user and the at least one building 30 that operates to alter physical characteristics thereof 106. There is provided means for a user in communication with the operational link to alter the physical characteristics of the selected building. For example, a user, having selected a building, may view information relating to the temperature of a zone in the building and may thereafter adjust that temperature. Another example comprises a user viewing information relating to occupancy and may thereafter adjust the lighting system to compensate. An analogous relationship exists for operational link 20B between a user and the at least one building 30B that operates to alter physical characteristics thereof 106B.

FIGS. 6, 7, 9 & 10, depict a preferred embodiment of a system for managing buildings. A computer database 10B operates to store information relating to at least one building 30B, the information comprises building characteristics. Each building has associated therewith a facility, and each facility has associated therewith an account.

There is provided an operational link 20B between a user and the computer database 10B. A computer processor and memory 40B operate to perform the steps of, receiving a user request to interact with the computer database 100B, providing means for a user to establish a selected account 100B, 102B, providing means for a user to establish a selected facility 103B, providing means for a user to establish a selected building 104B, and presenting a user with information relating to the selected building 105B.

The means for a user to establish a selected account comprises, presenting the user with a map 200B depicting geographic information relating to the buildings, the map operates to receive user input. Although preferred, other embodiments, such as a drop down list, are possible.

Figure 8:
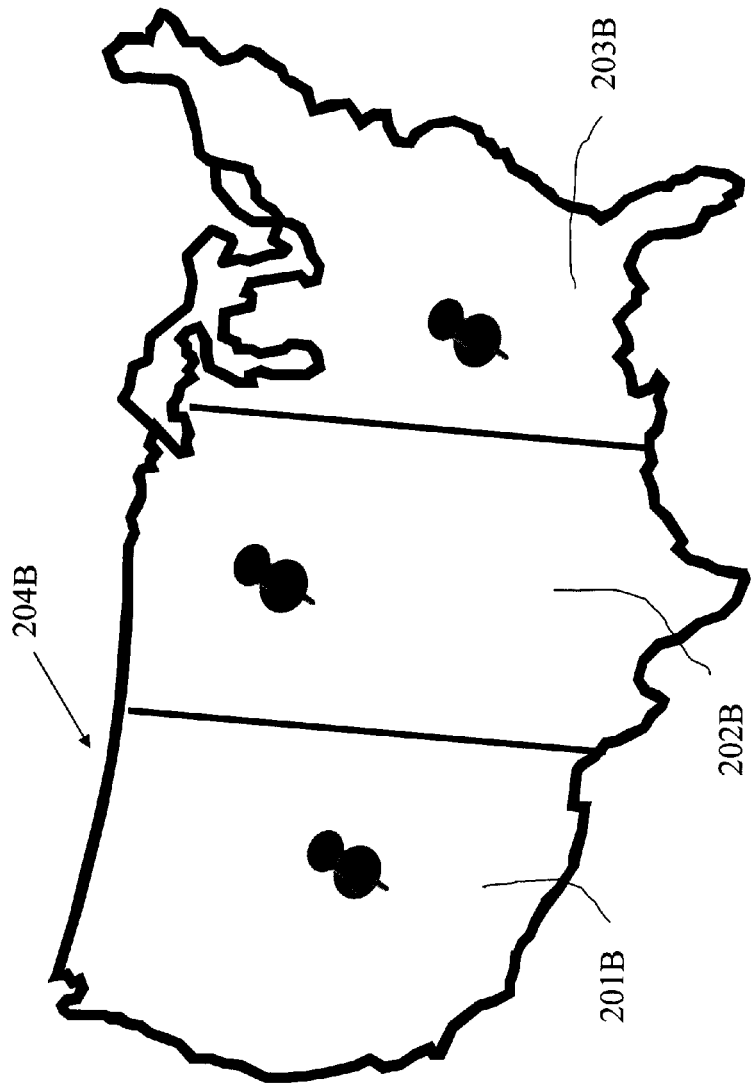
FIG. 8 depicts a graphical representation of a map of an alternative embodiment

FIG. 8 depicts an alternative embodiment comprising the map 204B having color coded regions 201B, 202B, 203B.

The computer processor and memory 40B further operate to perform the step of, presenting the user with information operative to create a graphical display 303B. A first region 300B operates to display adjacent photographs 304B, 305B of at least two buildings associated with the selected facility. The user can scroll this list sequentially to view all associated buildings.

A second region 301B operates to display a three dimensional image representative of the selected building and operates to allow manipulation of the view perspective of the three dimensional image. For example, an aerial photograph of a building may be rotated so as to view different sides of the building or to view rooftop equipment such as hvac equipment.

A third region 302B operates to display information relating to the selected building. The second region 301B is larger than the first region 300B.

An operational link 20B between a user and the at least one building operates to alter physical characteristics thereof 106B. Computer processor and memory 40B further operate to perform the step of allowing a user in communication with the operational link 20B to alter the physical characteristics of the selected building. Examples of such alterations are presented elsewhere herein.

What is claimed is:

1. A method for managing buildings comprising:
   providing a computer database operative to store information relating to at least one building, said information comprising building characteristics,
      each said building having associated therewith a facility,
      each said facility having associated therewith an account;
   providing an operational link between a user and said computer database;
   receiving a user request to interact with said computer database;
   providing means for a user to establish a selected account;
   providing means for a user to establish a selected facility;
   providing means for a user to establish a selected building;
   presenting a user with information relating to said selected building.

2. The method of claim 1 further comprising:
   said means for a user to establish a selected account comprising the step of presenting said user with a map depicting geographic information relating to said buildings, said map operative to receive user input.

3. The method of claim 2 further comprising said map having color coded regions.

4. The method of claim 1 further comprising the step of:
   presenting said user with information operative to create a graphical display comprising,
      a first region operative to display adjacent photographs of at least two buildings associated with said selected facility,
      a second region operative to display a three dimensional image representative of said selected building and operative to allow manipulation of the view perspective of said three dimensional image,
      a third region operative to display information relating to said selected building,
      said second region being larger than said first region.

5. The method of claim 1 further comprising:
   said information relating to said selected building comprising one or more of the set consisting of, an aerial photograph, building name, facility name, region name, primary human contact, address, number of floors, gross area, ownership, year built, structure type, total roof area, total facade area, number of roof sections, number of facade sections, current projects, capital improvements, proposals, reports, drawings, schematics, funding.

6. The method of claim 1 further comprising the steps of:
   providing an operational link between a user and said at least one building operative to alter physical characteristics thereof;
   providing means for a user in communication with said operational link to alter the physical characteristics of said selected building.

7. The method of claim 6 further comprising the steps of:
   said physical characteristics comprising climate control systems.

8. The method of claim 6 further comprising the steps of:
   said physical characteristics comprising lighting.

9. The method of claim 6 further comprising the steps of:
   said physical characteristics comprising electrical systems.

10. The method of claim 6 further comprising the steps of:
    said physical characteristics comprising plumbing systems.

11. A system for managing buildings comprising:
    a computer database operative to store information relating to at least one building, said information comprising building characteristics,
       each said building having associated therewith a facility,
       each said facility having associated therewith an account;
    an operational link between a user and said computer database;
    a computer processor and memory operative to perform the steps of,
       receiving a user request to interact with said computer database,
       providing means for a user to establish a selected account,
       providing means for a user to establish a selected facility,
       providing means for a user to establish a selected building,
       presenting a user with information relating to said selected building.

12. The system of claim 11 further comprising:
    said means for a user to establish a selected account comprising,
    presenting said user with a map depicting geographic information relating to said buildings, said map operative to receive user input.

13. The system of claim 12 further comprising:
said map having color coded regions.

14. The system of claim 11 further comprising:
said computer processor and memory further operative to perform the step of,
presenting said user with information operative to create a graphical display comprising,
- a first region operative to display adjacent photographs of at least two buildings associated with said selected facility,
- a second region operative to display a three dimensional image representative of said selected building and operative to allow manipulation of the view perspective of said three dimensional image,
- a third region operative to display information relating to said selected building,
- said second region being larger than said first region.

15. The system of claim 11 further comprising:
said information relating to said selected building comprising one or more of the set consisting of, an aerial photograph, building name, facility name, region name, primary human contact, address, number of floors, gross area, ownership, year built, structure type, total roof area, total facade area, number of roof sections, number of facade sections, current projects, capital improvements, proposals, reports, drawings, schematics, funding.

16. The system of claim 11 further comprising:
an operational link between a user and said at least one building operative to alter physical characteristics thereof;
said computer processor and memory further operative to perform the step of providing means for a user in communication with said operational link to alter the physical characteristics of said selected building.

17. The system of claim 16 further comprising:
said physical characteristics comprising climate control systems.

18. The system of claim 16 further comprising:
said physical characteristics comprising lighting.

19. The system of claim 16 further comprising:
said physical characteristics comprising electrical systems.

20. The system of claim 16 further comprising:
said physical characteristics comprising plumbing systems.

\* \* \* \* \*